US011572424B2

(12) United States Patent
Robbins et al.

(10) Patent No.: US 11,572,424 B2
(45) Date of Patent: Feb. 7, 2023

(54) CHEMICALLY RESISTANT FLUORINATED MULTIBLOCK POLYMER STRUCTURES, METHODS OF MANUFACTURING AND USE

(71) Applicant: TeraPore Technologies, Inc., South San Francisco, CA (US)

(72) Inventors: Spencer W. Robbins, San Francisco, CA (US); Rachel M. Dorin, San Francisco, CA (US)

(73) Assignee: TeraPore Technologies, Inc., South San Francisco, CA (US)

( * ) Notice: Subject to any disclaimer, the term of this patent is extended or adjusted under 35 U.S.C. 154(b) by 0 days.

(21) Appl. No.: 16/612,630

(22) PCT Filed: May 10, 2018

(86) PCT No.: PCT/US2018/032118
§ 371 (c)(1),
(2) Date: Nov. 11, 2019

(87) PCT Pub. No.: WO2018/209121
PCT Pub. Date: Nov. 15, 2018

(65) Prior Publication Data
US 2020/0199264 A1 Jun. 25, 2020

Related U.S. Application Data

(60) Provisional application No. 62/505,589, filed on May 12, 2017.

(51) Int. Cl.
| | |
|---|---|
| *C08F 8/24* | (2006.01) |
| *B01D 65/08* | (2006.01) |
| *B01D 67/00* | (2006.01) |
| *B01D 69/02* | (2006.01) |
| *B01D 71/80* | (2006.01) |
| *C08J 9/28* | (2006.01) |

(52) U.S. Cl.
CPC ............... *C08F 8/24* (2013.01); *B01D 65/08* (2013.01); *B01D 67/0013* (2013.01); *B01D 69/02* (2013.01); *B01D 71/80* (2013.01); *C08J 9/28* (2013.01); *B01D 2325/30* (2013.01); *C08J 2300/102* (2013.01)

(58) Field of Classification Search
CPC ........................................................ C08F 8/24
See application file for complete search history.

(56) References Cited

U.S. PATENT DOCUMENTS

| | | | |
|---|---|---|---|
| 3,673,272 A | 6/1972 | Dean | |
| 4,014,798 A | 3/1977 | Rembaum | |
| 4,399,035 A | 8/1983 | Nohmi et al. | |
| 4,666,991 A | 5/1987 | Matsui et al. | |
| 4,720,343 A | 1/1988 | Walch et al. | |
| 4,880,441 A | 11/1989 | Kesting et al. | |
| 5,114,585 A | 5/1992 | Kraus et al. | |
| 5,130,024 A | 7/1992 | Fujimoto et al. | |
| 5,158,721 A | 10/1992 | Allegrezza et al. | |
| 5,647,989 A | 7/1997 | Hayashi et al. | |
| 5,700,902 A | 12/1997 | Hancock et al. | |
| 5,700,903 A | 12/1997 | Hancock et al. | |
| 5,792,227 A | 8/1998 | Kahlbaugh et al. | |
| 5,805,425 A | 9/1998 | Peterson | |
| 5,907,017 A * | 5/1999 | Ober ................... | C08F 297/046 |
| | | | 525/61 |
| 5,928,792 A | 7/1999 | Moya | |
| 6,033,370 A | 3/2000 | Reinbold et al. | |
| 6,241,886 B1 | 6/2001 | Kitagawa et al. | |
| 6,354,443 B1 | 3/2002 | Moya | |
| 6,379,796 B1 | 4/2002 | Uenishi et al. | |
| 6,503,958 B2 | 1/2003 | Hughes et al. | |
| 6,565,782 B1 | 5/2003 | Wang et al. | |
| 6,592,764 B1 | 7/2003 | Stucky et al. | |
| 6,592,991 B1 | 7/2003 | Wiesner et al. | |
| 6,663,584 B2 | 12/2003 | Griesbach, III et al. | |
| 7,056,455 B2 | 6/2006 | Matyjaszewski et al. | |
| 7,438,193 B2 | 10/2008 | Yang et al. | |
| 7,927,810 B2 | 4/2011 | Togawa et al. | |
| 8,025,960 B2 | 9/2011 | Dubrow et al. | |
| 8,147,685 B2 | 4/2012 | Pritchard | |
| 8,206,601 B2 | 6/2012 | Bosworth et al. | |
| 8,294,139 B2 | 10/2012 | Marsh et al. | |
| 8,939,294 B2 | 1/2015 | Moore et al. | |
| 9,162,189 B1 | 10/2015 | Aamer et al. | |
| 9,169,361 B1 | 10/2015 | Aamer | |
| 9,193,835 B1 | 11/2015 | Aamer | |
| 9,441,078 B2 | 9/2016 | Aamer | |

(Continued)

FOREIGN PATENT DOCUMENTS

| | | |
|---|---|---|
| CA | 2886437 A1 | 5/2014 |
| CA | 3022510 A1 | 11/2017 |

(Continued)

OTHER PUBLICATIONS

Radjabian, Polymer, 55 (2014), 2986-2997 (Year: 2014).*
Ren et al, J. Am. Chem. Soc, 1998, 120, 6830-6831 (Year: 1998).*
VolKer Abetz, "Isoporous Block Copolymer Membranes," *Macromolecular Rapid Communications*, vol. 36, pp. 10-22, 2015.
Kharitonov et al., "Surface modification of polymers by direct fluorination: A convenient approach to improve commercial properties of polymeric articles," *Pure Appl. Chem.*, vol. 81, No. 3, pp. 451-471, 2009.

(Continued)

*Primary Examiner* — Irina Krylova
(74) *Attorney, Agent, or Firm* — Innovators Legal

(57) ABSTRACT

Multi-block isoporous structures for non-aqueous and/or harsh chemical media having at least one of high separation specificity, chemical resistance, and antifouling properties, methods of manufacturing and use, for replacements or alternatives to existing separation membrane technologies.

10 Claims, 1 Drawing Sheet

(56) References Cited

U.S. PATENT DOCUMENTS

| | | |
|---|---|---|
| 9,469,733 B2 | 10/2016 | Aamer et al. |
| 9,527,041 B2 | 12/2016 | Wiesner et al. |
| 10,711,111 B2* | 7/2020 | Wiesner .............. C08F 297/04 |
| 10,912,868 B2 | 2/2021 | Ushiro et al. |
| 2003/0073158 A1 | 4/2003 | Ma |
| 2003/0171560 A1 | 9/2003 | Peters |
| 2003/0226818 A1* | 12/2003 | Dunbar ................ B81B 3/0005 |
| | | 216/20 |
| 2004/0065607 A1 | 4/2004 | Wang et al. |
| 2004/0122388 A1 | 6/2004 | McCormack et al. |
| 2004/0126778 A1 | 7/2004 | Lemmens et al. |
| 2004/0129678 A1 | 7/2004 | Crowley et al. |
| 2004/0138323 A1 | 7/2004 | Stenzel-Rosebaum et al. |
| 2004/0242822 A1 | 12/2004 | Gawrisch et al. |
| 2006/0014902 A1 | 1/2006 | Mays et al. |
| 2006/0085062 A1 | 4/2006 | Lee et al. |
| 2006/0094598 A1 | 5/2006 | Simon |
| 2006/0151374 A1 | 7/2006 | Wu et al. |
| 2006/0283092 A1 | 12/2006 | Chinone |
| 2007/0029256 A1 | 2/2007 | Nakano et al. |
| 2007/0265174 A1* | 11/2007 | Schlenoff ............... B82Y 30/00 |
| | | 525/50 |
| 2007/0287241 A1 | 12/2007 | Takahashi et al. |
| 2008/0097271 A1 | 4/2008 | Lo et al. |
| 2008/0193818 A1 | 8/2008 | Mays |
| 2008/0261255 A1 | 10/2008 | Tolosa et al. |
| 2009/0173694 A1 | 7/2009 | Peinemann et al. |
| 2009/0181315 A1 | 7/2009 | Spatz et al. |
| 2009/0208726 A1 | 8/2009 | Yang et al. |
| 2009/0209726 A1 | 8/2009 | Matsumoto et al. |
| 2009/0239381 A1 | 9/2009 | Nishimi et al. |
| 2010/0051546 A1 | 3/2010 | Vuong et al. |
| 2010/0108599 A1 | 5/2010 | Vizvardi et al. |
| 2010/0167271 A1 | 7/2010 | Ryan |
| 2010/0181288 A1 | 7/2010 | Tang et al. |
| 2010/0219383 A1 | 9/2010 | Eklund |
| 2010/0224555 A1 | 9/2010 | Hoek et al. |
| 2011/0130478 A1 | 6/2011 | Warren et al. |
| 2011/0240550 A1 | 10/2011 | Moore et al. |
| 2011/0275077 A1 | 11/2011 | James et al. |
| 2012/0048799 A1 | 3/2012 | Na et al. |
| 2012/0318741 A1 | 12/2012 | Peinemann et al. |
| 2013/0053748 A1 | 2/2013 | Cotton |
| 2013/0112613 A1 | 5/2013 | Kang et al. |
| 2013/0129972 A1 | 5/2013 | Xu |
| 2013/0193075 A1 | 8/2013 | Liang et al. |
| 2013/0344375 A1 | 12/2013 | Brant et al. |
| 2014/0005364 A1 | 1/2014 | Gottschall et al. |
| 2014/0217012 A1* | 8/2014 | Wiesner .............. B01D 71/26 |
| | | 210/500.22 |
| 2014/0363572 A1 | 12/2014 | Moll et al. |
| 2014/0371698 A1 | 12/2014 | Chang et al. |
| 2015/0151256 A1* | 6/2015 | Abetz .................. B01D 71/08 |
| | | 210/500.28 |
| 2015/0343395 A1 | 12/2015 | Aamer et al. |
| 2015/0343398 A1 | 12/2015 | Aamer et al. |
| 2016/0023171 A1 | 1/2016 | Phillip et al. |
| 2016/0229969 A1 | 8/2016 | Wiesner et al. |
| 2016/0288062 A1 | 10/2016 | Ait-Haddou et al. |
| 2016/0319158 A1 | 11/2016 | Fleury et al. |
| 2016/0375409 A1 | 12/2016 | Stasiak et al. |
| 2017/0022337 A1 | 1/2017 | Wiesner et al. |
| 2017/0105877 A1 | 4/2017 | Buteux et al. |
| 2017/0327649 A1 | 11/2017 | Wiesner et al. |
| 2018/0043314 A1 | 2/2018 | Onyemauwa et al. |
| 2018/0043656 A1 | 2/2018 | Song et al. |
| 2019/0233307 A1 | 8/2019 | Fujimura et al. |
| 2020/0238227 A1* | 7/2020 | Dorin ................... B01D 71/28 |
| 2020/0339770 A1* | 10/2020 | Wiesner .............. C08L 53/00 |
| 2021/0040281 A1* | 2/2021 | Dorin ................... B01D 71/80 |

FOREIGN PATENT DOCUMENTS

| | | |
|---|---|---|
| CN | 201211329 Y | 3/2009 |
| CN | 101460203 A | 6/2009 |
| CN | 101516481 A | 8/2009 |
| CN | 101969902 A | 2/2011 |
| CN | 102224163 A | 10/2011 |
| CN | 102892486 A | 1/2013 |
| CN | 103797053 A | 5/2014 |
| CN | 104159657 A | 11/2014 |
| CN | 104768506 A | 7/2015 |
| CN | 105273211 A | 1/2016 |
| CN | 105536580 A | 5/2016 |
| CN | 106344539 A | 1/2017 |
| DE | 102012207338 A1 | 11/2013 |
| DE | 102014213027 A1 | 1/2016 |
| EP | 2160946 A1 | 3/2010 |
| EP | 2703016 A1 | 3/2014 |
| EP | 2705077 A2 | 3/2014 |
| EP | 2977101 A1 | 1/2016 |
| EP | 3056260 A1 | 8/2016 |
| EP | 3 284 529 A1 | 2/2018 |
| EP | 3541500 A1 | 9/2019 |
| EP | 3544720 A1 | 10/2019 |
| EP | 3658262 A1 | 6/2020 |
| FR | 3037071 A1 | 12/2016 |
| JP | 54-145766 A | 11/1979 |
| JP | 04-022428 A | 1/1992 |
| JP | 09-048861 A | 2/1997 |
| JP | 2002-537422 A | 11/2002 |
| JP | 2005-500132 A | 1/2005 |
| JP | 2006-175207 A | 7/2006 |
| JP | 2011-117956 A | 6/2011 |
| JP | 2011-131208 A | 7/2011 |
| JP | 2011-189229 A | 9/2011 |
| JP | 2012-246162 A | 12/2012 |
| JP | 2015-083299 A | 4/2015 |
| JP | 2015-167914 A | 9/2015 |
| JP | 2016-514049 A | 5/2016 |
| JP | 2016-526089 A | 9/2016 |
| JP | 2017-153616 A | 9/2017 |
| JP | 2018-500401 A | 1/2018 |
| JP | 2019-514687 A | 6/2019 |
| KR | 10-2009-0088124 A | 8/2009 |
| KR | 10-2012-0047269 A | 5/2012 |
| KR | 10-2012-0124412 A | 11/2012 |
| KR | 2012-0124412 A | 11/2012 |
| KR | 10-2016-0020404 A | 2/2016 |
| KR | 10-2018-0019059 A | 2/2018 |
| SG | 10201706492 A | 3/2018 |
| SG | 11201904425 Y | 6/2019 |
| SG | 11202000664 Y | 2/2020 |
| WO | 2005/082501 A1 | 9/2005 |
| WO | WO 2005/091755 A2 | 10/2005 |
| WO | 2008/034487 A1 | 3/2008 |
| WO | 2010/051150 A | 5/2010 |
| WO | 2011/098851 A1 | 8/2011 |
| WO | 2011/111679 A1 | 9/2011 |
| WO | 2011/123033 A1 | 10/2011 |
| WO | 2012/151482 A2 | 11/2012 |
| WO | 2014/164793 A2 | 10/2014 |
| WO | 2015/048244 A1 | 4/2015 |
| WO | 2015/168409 A1 | 11/2015 |
| WO | 2015/188225 A1 | 12/2015 |
| WO | 2016/023765 A1 | 2/2016 |
| WO | 2016/031834 A1 | 3/2016 |
| WO | 2016/066661 A1 | 5/2016 |
| WO | 2017/189697 A1 | 11/2017 |
| WO | 2018/043209 A1 | 3/2018 |
| WO | 2018/055801 A1 | 3/2018 |
| WO | 2018/093714 A1 | 5/2018 |
| WO | 2018/097988 A1 | 5/2018 |
| WO | 2019/023135 A1 | 1/2019 |
| WO | 2019/178045 A1 | 9/2019 |

(56) References Cited

FOREIGN PATENT DOCUMENTS

| | | |
|---|---|---|
| WO | 2019/178077 A1 | 9/2019 |
| WO | 2019/195396 A1 | 10/2019 |

OTHER PUBLICATIONS

Shahkaramipour et al., "Membranes with Surface-Enhanced Antifouling Properties for Water Purification," Membranes, vol. 7, pp. 13, 2017.
Lubomir et al., "Deposition of polymeric perfluored thin films in proton ionic membranes by plasma processes," Applied Surface Science, vol. 254, pp. 173-176, 2007.
A Bruil et al., "The Mechanisms of Leukocyte Removal by Filtration." Transfusion Medicine Reviews vol. IX No. 2, pp. 145-166, Apr. 1995.
A. A. Shukla et al., "Recent Advances in Large-Scale Production of Monoclonal Antibodies and Related Proteins." Trends in Biotechnology, vol. 28, No. 5, pp. 253-261, 2010.
A.S. Devonshire et al., "Towards Standardisation of Cell-Free DNA Measurement in Plasma: Controls for Extraction Efficiency, Fragment Size Bias and Quantification." Anal. Bioanal. Chem., vol. 406, pp. 6499-6512, 2014.
Behler, Ansgar (Edited by), "Poren," Rompp Verlag, Rompp online 4.0, Aug. 2005, retrieved from Internet: URL: https://roempp.thieme.de/roempp4.0/do/data/RD-16-03734.
Breiner et al, "Structural Characterization of the "Knitting Pattern" in Polystyrene-block-poly(ethylene-co-butylene)-block-poly(methyl methacrylate) Triblock Copolymers", Macromolecules 1998, 31, 135-141.
Clodt et al., "Performance study of isoporous membranes with tailored pore sizes", Journal of Membrane Science, vol. 495, Jul. 29, 2015, pp. 334-340.
D. Keskin, et al., "Postmodification of PS-b-P4VP Diblock Copolymer Membranes by ARGET ATRP." Langmuir, vol. 30, pp. 8907-8914, Jun. 19, 2014.
Dai et al., "Fabrication of 2D ordered structure of self-assembled block copolymers containing gold nanoparticles," Journal of Crystal Growth, vol. 288, No. 1, pp. 128-136, Feb. 2, 2006.
Doan Minh Y Nhi, "Investigation of the Effects of UV-Crosslinking on Isoporous Membrane Stability." KTH Chemical Science and Engineering, pp. 1-46, 2011.
E. Gifford et al., "Sensitivity Control of Optical Fiber Biosensors Utilizing Turnaround Point Long Period Gratings with Self-Assembled Polymer Coatings." Proceedings of the SPIE, vol. 6659 pp. 66590D-1-66590D-9 Sep. 30, 2007.
F. A. Carey, Ornanic Chemistry, Fifth Edition, pp. 859-860, 2003.
Fink, Johannes Karl. Handbook of Engineering and Specialty Thermoplastics. 2011. vol. 2, Water Soluble Polymers. Chapter 7. p. 189-192. (Year: 2011).
H. Ahlbrecht et al., "Stereoselective synthesis. Methods of Organic Chemistry." Houben-Weyl, vol. E 21 a, 4th Edition Supplement, 1995.
H. Sai et al., "Hierarchical Porous Polymer Scaffolds from Block Copolymers." Science, vol. 341, pp. 530-533, Aug. 2, 2013.
Hanselmann, Blockcopolymere, ROMPP Online, Version 3.37, Dokumentkennung RD-02-02007. Jul. 1, 2009.
Hilke et al., "Block copolymer/homopolymer dual-layer hollow fiber membranes", Journal of Membrane Science, vol. 472, Aug. 23, 2014, pp. 39-44.
Hoek et al., Physical-chemical properties, separation performance, and fouling resistance of mixed-matrix ultrafiltration member, Desalination, Elsevier, vol. 283, pp. 89-99. May 4, 2011.
Huang Yan et al: "Highly Ordered Mesoporous Carbonaceous Frameworks from a Template of a Mixed Amphiphilic Triblock-Copolymer System of PEO-PPO-PEO and Reverse PPO-PEO-PPO", Chemistry—An Asian Journal, vol. 2, No. 10, Oct. 1, 2007 (Oct. 1, 2007), pp. 1282-1289.
J. I. Clodt et al., "Carbohydrates as Additives for the Formation of Isoporous PS-b-P4VP Diblock Copolymer Membranes." Macromolecular Rapid Communications, vol. 34, 190-194, 2013.
J. Suzuki et al., "Morphology of ABC Triblock Copolymer/Homopolymer Blend Systems." Journal of Polymer Science Part B: Polymer Physics vol. 40 pp. 1135-1141 Apr. 22, 2002.
Julie N.L. Albert et al. "Self-assembly of block copolymer thin films", Materialstoday, vol. 13, is. 6, Jun. 2010, pp. 24-33.
Jung et al., Structure Formation of Integral Asymmetric Composite Membranes of Polystyrene-block-Poly(2-vinylpuridine) on a Nonwoven, Macromolecular Materials and Engineering, vol. 297, No. 8, pp. 790-798. Feb. 9, 2012.
Kanegsberg, "Washing, Rinsing, and Drying: Items to Consider for the Optimization of Your Cleaning Process," https://www.materialstoday.com/metal-finishing/features/washing-rinsing-and-drying-items-to-consider-for/, Sep. 1, 2005. p. 2, paragraph 6.
Karunakaran et al. "IsoporousIPS-b-PEO ultrafiltration membranes via self-assembly and water-induced phase separatioln" Journal of Membrane Science, vol. 453 Issue 1 (Nov. 16, 2013): pp. 471-477.
Khademi, M. Application of Tubular Crssflow Microfiltration in Harvesting Microalgae. LSU Master's Theses. 2014, pp. 39-43.
Laboratory-Equipment.com, "Applications for Laboratory Ovens Across the Sciences." https://www.laboratory-equipment.com/blog/all-laboratory-equipment-blogs/applications-for-laboratory-ovens-across-the-sciences/, Oct. 15, 2015, p. 1, section "Standard and Specialized Lab Oven Applications".
Lawrence E. Nielsen, "Cross-Linking-Effect on Physical Properties of Polymers." Journal of Marcomolecular Science Part C, vol. 3(1 ), pp. 69-103, 2008.
Li Yuk Mun et al: "Asymmetric Membranes from Two Chemically Distinct Triblock Terpolymers Blended during Standard Membrane Fabrication", Macromolecular Rapid Communications, vol. 37, No. 20, Oct. 1, 2016 (Oct. 1, 2016), pp. 1689-1693.
Mu X. et al., Nano-porous Nitrocellulose Liquid Bandage Modulates Cell and Cytokine Response and Accelerates Cutaneous Wound Healing in a Mouse Model. Carbohydr Polym., Sep. 25, 2015, vol. 136, pp. 618-629.
N. Lefevre et al., "Self-Assembly in Thin Films of Mixtures of Block Copolymers and Homopolymers Interacting by Hydrogen Bonds." Macromolecules, vol. 43, No. 18, pp. 7734-7743 Aug. 17, 2010.
Parul Jain et.al., "Protein purification with polymeric affinity membranes containing functionalized poly (acid) brushes", Biomacromolecules, 2010, vol. 11, No. 4, 1019-1026.
Peinemann et al, "Asymmetric superstructure formed in a block copolymer via phase separation", Nature Materials, V6, Dec. 2007, pp. 992-996.
Phillip, W., et al., Tuning Structure and Properties of Graded Triblock Terpolymer-Based Mesoporous and Hybrid Films, Nano Letters, Jun. 7, 2011, Nov. 11, pp. 2892-2900.
Qiu et al. "Selective Separation of Similarly Sized Proteins with Tunable Nanoporous Block Copolymer Membranes." ACS Nano. vol. 7, No. 1, 2013. p. 768-776 (Year: 2013).
R. van Reis et al., "High Performance Tangential Flow Filtration." Biotechnology and Bioengineering, vol. 56, No. 1, pp. 71-82, Oct. 5, 1997.
Roland et al., "Supplementary Information Block Copolymer/Homopolymer Dual-Layer Hollow Fiber Membranes Imaging and Characterization Lab and c Water Desalination", Aug. 23, 2014, pp. 1-3.
S. Breitbach et al., "Direct Quantification of Cell-Free, Circulating DNA from Unpurified Plasma." PLOS One, vol. 9, Issue 3, e87838. pp. 1-11.
S. P. Nunes et al., "From Micelle Supramolecular Assemblies in Selective Solvents to Isoporous Membranes." Langmuir, DOI 10.1021/la201439P, Jun. 28, 2011.
S. Rangou et al., "Self-Organized Isoporous Membranes with Tailored Pore Sizes." Journal of Membrane Science, vol. 451, pp. 266-275, 2014.
Tiraferri et al., Binding Silver and Silica Nanoparticles to Polymeric Membrane Surfaces for Novel Anti-Biofouling Properties, ACS Division Proceedings, Division of Polymer Chemistry, Meeting 242, Aug. 28-Sep. 1, 2011, Denver, CO, USA. Sep. 1, 2011.

(56) References Cited

OTHER PUBLICATIONS

Wang Zhaogen et al: "Isoporous membranes with gradient porosity by selective swelling of UV-crosslinked block copolymers", Journal of Membrane Science, vol. 476, Feb. 1, 2015 (Feb. 1, 2015), pp. 449-456.
Y Nhi et al., "Investigation of the Effect of UV-Crosslin King on Isoporous Membrane Stability", Chemical Science and Engineering, vol. 46, Dec. 12, 2011.
Yizhou Zhang et al: "Nanoporous membranes generated from self-assembled block polymer precursors: Quo Vadis?", Journal of Applied Polymer Science, vol. 132, No. 21, Jun. 5, 2015.
Yizhou Zhang, et al., "Microfiltration and Ultrafiltration Membrane Science and Technology". Journal of Applied Polymer Science, app. 41683, on. 1-17, 2015.
Young et al., Robert J., Introduction to Polymers, Third Edition, CRC Press 2011, pp. 6-9 and 456-457.

* cited by examiner (A) 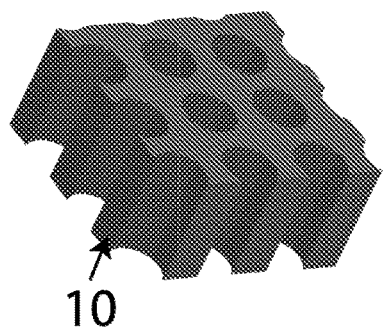
10
(B) 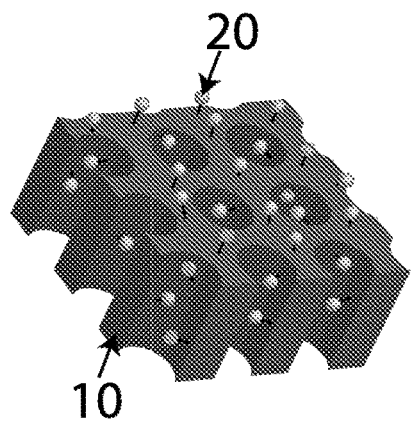
20
10
(C) 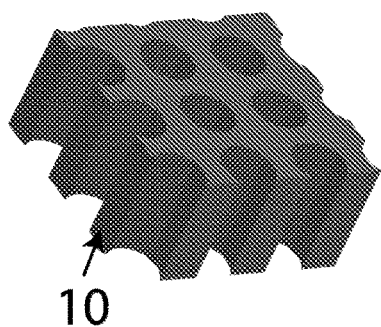  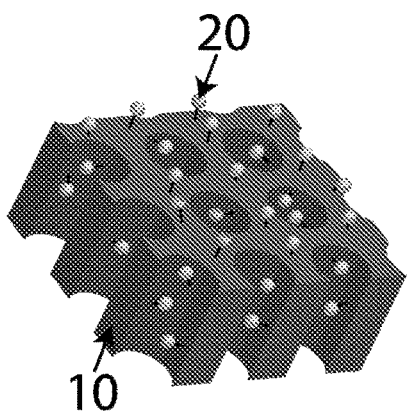
10   30   20
           10

CHEMICALLY RESISTANT FLUORINATED MULTIBLOCK POLYMER STRUCTURES, METHODS OF MANUFACTURING AND USE

CROSS-REFERENCE TO RELATED PATENT APPLICATIONS

The present application claims the benefit of priority to U.S. Provisional Patent application 62/505,589, filed May 12, 2017, the entirety of which is incorporated herein by reference.

FIELD OF THE INVENTION

The invention relates to multi-block isoporous structures resistant to non-aqueous and/or harsh chemical media, where the structures have at least one of high flux, high separation specificity, chemical resistance, and antifouling properties, and methods of manufacturing and use, as replacements or alternative to existing separation membrane technologies.

BACKGROUND OF THE INVENTION

Membranes have been manufactured to be resistant to chemicals, heat, and radiation, by reacting fluorine containing monomers, e.g., tetrafluoroethylene, vinylidene fluoride to produce polytetrafluoroethylene (PTFE) or poly(vinylidene fluoride), which are hydrophilic or by providing a hydrophilic fluorine surface. These fluorine containing polymers are not isoporous, not produced by self-assembly, and do not self-assemble. Block copolymers containing fluorinated blocks have been used to create dense ion-conducting membranes, for liquid/liquid separations, or in gas/gas separations. Similarly, these fluorinated block copolymers are non-isoporous, and lack the pore tuning properties associated with self-assembled polymers and flow characteristics.

Fluoropolymer membranes are described in U.S. Pat. No. 5,130,024, where PTFE membranes are coated with hydrophilic fluorine containing copolymers on pores. Other examples of surface modified membrane are described in U.S. Pat. No. 5,928,792, where the porous membrane surface is modified with perfluorocarbon copolymer, and U.S. Pat. No. 6,354,443 where the membrane surface is coated with hydrophilic fluorinated copolymers.

In addition, fluorine-containing graft copolymers and adhesive composed essentially of the copolymer and a composite membrane of a support and the copolymer are taught in U.S. Pat. No. 4,666,991. In the U.S. Pat. No. 4,666,991, a fluorinated polymer is grafted to another polymer. Whereas other prior art techniques involve applying a fluorinated graft copolymer to existing membranes physically, e.g., dip coating, spin coating, etc.

Hollow fiber, porous membranes, with layers formed from polyethylene, polypropylene, poly (4-methylpentene-1), poly (vinylidene fluoride) or polyoxymethylene, are disclosed in U.S. Pat. No. 6,379,796. The porous layers are interposed with layers of a homogeneous thin film. The homogeneous film can include two material, where the first material is a polymer blend composed of a styrene-based thermoplastic elastomer and a polyolefin. Where the styrene-based thermoplastic elastomer and be "A block copolymer in which the hard segments comprise a styrene polymer and the soft segments comprise a polymer derived from at least one monomer selected from butadiene, ethylene-butylene isoprene and ethylene-propylene" or "A random copolymer composed of two or more types of constitutional units formed from styrene and at least one of butadiene, ethylene-butylene, isoprene and ethylene-propylene," none of which includes a fluorinated component. The second material disclosed in the patent is a copolymer of (2, 2-bistrifluoromethyl-4, 5-difluoro-1, 3-dioxole) and tetrafluoroethylene, but is not a block copolymer.

Copolymers of fluorinated polydienes and sulfonated polystyrenes are disclosed in U.S. Pat. No. 7,619,036, where the block copolymers include sulfonated polystyrene blocks A along with fluorinated blocks B, having the general diblock structure AB, and triblock structure ABA.

Existing fluorinated porous membranes that contain block copolymer components include a coating of a fluorine-containing polymer/copolymer. In addition, some chemistries in these block copolymer have undesirable fouling characteristics (e.g. undesirable physical and chemical interactions) with components of the feed stream.

However, as described, the predominant technique for surface modification involves providing a coating of a fluorine containing material, which coated product can have imperfections, such as pin-holes in the coating, or be susceptible to separation or delamination. In addition, isoporous block copolymer membranes are typically formed from vinyl-derived polymers that are soluble or unstable in many organic solvents. These features typically limit their use of vinyl-derived polymers to aqueous solutions and thus their overall utility. Thus, a need exists for chemically resistant isoporous structures without the drawbacks and limitations of existing polymer membranes (e.g., chemically resistant without needing a coating), chemically resistant to harsh chemical materials, (e.g., organic materials, inorganic and organic acids and bases), and provides a structure that self-assembles to provide a pore tunable structure that is suitable for separation processes involving organic materials, inorganic and organic acids and bases.

BRIEF DESCRIPTION OF THE DRAWINGS

FIG. 1 (A) is a schematic of an isoporous portion of material (10).

FIG. 1 (B) is a schematic of fluorinated (20) portions of an isoporous portion of material (20) formed directly from a fluorinated copolymer.

FIG. 1 (C) is a schematic of an isoporous portion of material (10) undergoing a chemical reaction (30) to fluorinate the isoporous material, yielding fluorinated (20) material.

SUMMARY OF THE INVENTION

Multiblock copolymers of the invention achieve self-assembled isoporous structures that permit high flux contemporaneously with solvent-resistance. The materials allow for multi-functionality of the isoporous materials, wherein at least one block can impart significant chemical resistance (if fluorinated, for example) while the other blocks provide other functionalities, e.g. mechanical integrity. These materials are particularly useful as chemically resistant and antifouling membranes for separations.

In the context of the invention, isoporous means having a substantially narrow pore diameter distribution. In the context of the invention, mesopores are defined as having a diameter of about 1 nm to about 200 nm. The isopores may also be mesoporous.

The invention relates to isoporous fluorinated block copolymer structures where at least one of the blocks is chemically modified to impart antifouling and/or chemical resistance properties to harsh solvent conditions from organic, acidic or basic materials, and other blocks provide mechanical integrity to the structure, to enhance its suitability for various environments. In an approach, at least one block is fluorinated prior to polymerization with other blocks. In an alternative approach, the multiblock polymer is chemically modified after the formation of the multiblock polymer.

The multiblock isoporous structures are of particular use for stocks comprising non-aqueous and/or harsh chemical media having at least one of high separation specificity, chemical resistance, and antifouling properties as replacements or alternatives to existing separation membrane technologies.

The present invention relates to block copolymer structures where at least one of the blocks is chemically fluorinated to impart chemical resistance to harsh solvent conditions from organic, acidic or basic materials.

The present invention relates to fluorinated polymer material with at least two distinct polymer blocks, wherein at least one of the blocks contains at least one of macro, meso, or micro pores, at least some of which are isoporous, wherein at least a portion of at least one polymer block is fluorinated. The mesopores are of about 1-200 nm in size and macropores are at least 200 nm or greater in size. The material is asymmetric or symmetric. The material contains at least one of macroporous domains and mesoporous domains. The block copolymer may comprise fluorinated portions either before or after isoporous material formation, or any combination of fluorination before or after isoporous material formation.

The present invention provides methods of preparing fluorinated polymer material with at least two distinct polymer blocks, by forming an isoporous structure of a multiblock copolymer, and then fluorinating at least a portion of at least one unfluorinated block with a post functionalization reaction.

The present invention provides methods where the isoporous material is formed by dissolving a polymer in at least one chemical solvent; dispensing a polymer solution onto a substrate or mold, or through a die or template; removing at least a portion of chemical solvent during which at least a portion of the polymer self-assembles; exposing the self-assembled material to a nonsolvent causing precipitation of at least a portion of the polymer; and optionally, washing the treated material.

The invention also includes a process of maintaining the integrity of an isoporous block polymer structures by chemically modifying at least one of the blocks with a fluorochemical moiety, and then forming an isoporous multiblock polymer structure.

The invention also includes separating an analyte of interest with high permeability and excellent selectivity, the membrane has uniform porosity, by contacting a non-aqueous liquid containing an analyte of interest with an isoporous fluorinated block polymer structures with at least two distinct polymer blocks.

One or more polymer blocks, or the overall polymer or polymers, may comprise complex polymer architectures, so long as the block copolymer self-assembles to generate the isoporous material. In this context, a "complex" block structure or polymer architecture signifies more than one monomer, chemistry, configuration, or structure in at least one block, or adjacent to blocks. A combination of different block copolymer starting materials is another complex architecture.

The invention also includes separating an analyte of interest with high permeability and excellent selectivity from a harsh chemical mixture generated by organic, acidic or basic liquids and the analyte of interest, by contacting the mixture with an isoporous fluorinated block polymer structure.

DETAILED DESCRIPTION OF THE INVENTION

The invention is an isoporous structure, e.g., a membrane, film, fabric, monolith, which comprises at least one multiblock polymer where at least one block comprises at least a portion that contains fluorine atoms ("fluorinated"). The incorporation of fluorine atoms imparts chemical resistance and antifouling properties to the isoporous block copolymer structure. This combination of fluorinated polymer blocks in a multiblock copolymer (e.g. A-B, A-B-C, A-B-C-D, or A-B-C-D-E) structure, produced by self-assembly, results in a high permeability and high selectivity isoporous structure for separations in non-aqueous liquid media, e.g., organic or harsh liquid media. Additionally, the fluorination adds antifouling behavior to the material.

Table 1 below provides non-limiting examples of block copolymer architectures.

Different letters denote different chemistries, where A, B, C, D and E are respectively polymer blocks formed from the same monomer, and -co- indicates a mixture of chemistries in a specific block. The distribution of mixtures of chemistries may be periodic (ordered), random/statistical, or graded within the block.

TABLE 1

|  | Formula |
| --- | --- |
| [A]-[B] | I |
| [A]-[B]-[C] | II |
| [A]-[B]-[C-co-D] | III |
| [A-co-B]-[C]-[D] | IV |
| [A-co-B]-[C-co-D] | V |
| [A]-[B]-[C]-[D] | VI |
| [A]-[B]-[C]-[D]-[E] | VII |

As shown in Table 1, at least two distinct polymer blocks are present. At least one of the blocks contains at least one of macro, meso, or micro pores, at least some of which are isoporous, wherein at least a portion of at least one polymer block is fluorinated.

Mesopores may be in the range of about 1 nm to about 200 nm. In an embodiment, the mesopores are in the range of 1 nm to 200 nm. In an embodiment, the mesopores are in the range of 3 nm to 200 nm. In an embodiment, the mesopores are in the range of 5 nm to 200 nm. In an embodiment, the mesopores are in the range of 5 nm to 100 nm. In an embodiment, the mesopores are in the range of 10 nm to 100 nm.

The fluorinated isoporous structures are asymmetric, symmetric, partially symmetric or partially asymmetric.

The fluorinated isoporous structures are supported by a porous support or are unsupported. The fluorinated isoporous structures are in the form of two-dimensional (e.g. films, flat sheets) or three-dimensional (e.g. monoliths, beads, hollow fibers, tubular) structures.

The fluorinated isoporous structures are suitable as a separation media, and/or as a fabric with desirable protective properties (e.g. clothing, bandages). In the liquid-based separation application, the liquids being exposed to the fluorinated isoporous structures are not limited to purely aqueous solutions. The chemical stability imparted to the fluorinated isoporous structures from the fluorination allows solutions contacting the membrane to contain in part, or completely, non-aqueous liquids, as well as aqueous solutions that may otherwise degrade, decompose, or dissolve nonfluorinated structures. The harsh media in which the fluorinated isoporous structure may be used include, for example, highly acidic solutions, highly basic solutions, petrochemical products, organic solvents, and other organic small molecules. The fluorination of the block copolymers also imparts further heat resistance to the membranes, allowing operation at elevated temperatures.

The fluorinated isoporous structures may be achieved through several different approaches. In some approaches, at least a portion of the isoporous material is fluorinated before the formation of the isoporous structure. In some approaches, at least a portion of the isoporous material is fluorinated after the formation of the isoporous structure. In one approach, the structures are achieved by incorporating fluorinated monomer as at least a portion of the monomer feed, polymerizing the monomers to form a multiblock fluorinated polymer, and then forming an isoporous structure. In another approach, the structures are achieved by incorporating fluorinated monomer as at least a portion of the monomer feed, polymerizing the monomers to form a multiblock fluorinated copolymer, and then forming an isoporous structure, then fluorinating at least a portion of an unfluorinated block with a post functionalization reaction. In another approach, the structures are achieved by forming an isoporous structure from a multiblock copolymer, then fluorinating at least a portion of at least one unfluorinated block with a post functionalization reaction. In another approach, the structures are achieved by fluorinating at least a portion of at least one unfluorinated block of a block copolymer and then forming an isoporous structure.

In an approach, fluorine atoms are incorporated into at least a portion of at least one block of the copolymer which is used to fabricate the structure, by first fluorinating the monomer, and then polymerizing the fluorinated block with the other polymer blocks. Another approach is modifying at least a portion of at least one block of a multiblock polymer to be fluorinated, then forming the isoporous structure. Yet another approach is modifying an already fabricated isoporous structure to incorporate fluorine atoms into at least a portion of at least one block of the copolymer comprising the membrane.

The multiblock polymer must at least partially self-assemble when processed from a deposition solution comprising the multiblock polymer and a solvent system. During the process, at least a portion of the solvent system is removed; then, the material is exposed to a phase separation solvent system, such that at least a portion of the polymer material precipitates.

Suitable, non-limiting examples of fluorinated and unfluorinated polymer blocks include the following:

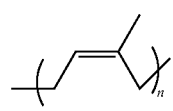

cis-1,4-poly(isoprene)

1

-continued

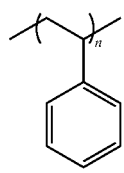

Poly(styrene)

2

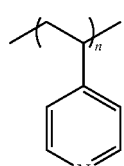

Poly(4-vinylpyridine)

3

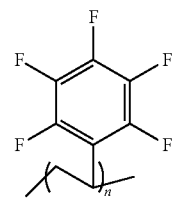

Poly(pentafluorostyrene)

4

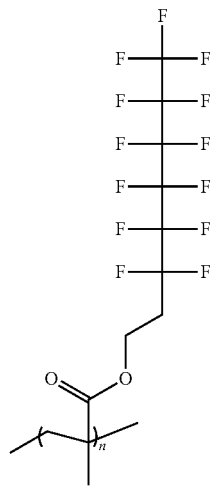

Poly(3,3,4,4,5,5,6,6,7,7,8,8,8-tridecafluorooctyl 2-methylpropanoate)

5

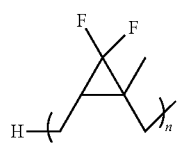

Poly(1,2-difluoro-2,2,3,-trimethylcyclopropane)

6

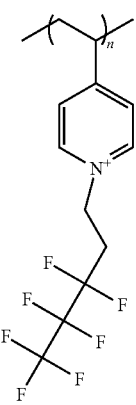

Poly(4-ethyl-1(3,3,4,4,5,5-heptafluoropentyl)pyridin-1-ium)

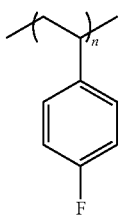

Poly(4-fluorostyrene)

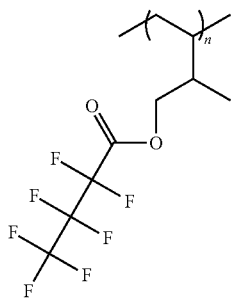

Poly(2-methylbutyl heptafluorobutanoate)

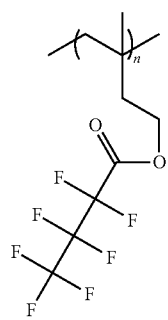

Poly(3-methylbutyl heptafluorobutanoate)

The invention also comprises separating and/or detecting and/or isolating an analyte of interest, comprising contacting an organic material and analyte containing fluid with the multiblock fluorinated isoporous polymer structure to obtain or detect the analyte of interest.

The multiblock polymer structures incorporate fluorine atoms through direct polymerization of fluorinated monomer and/or post-polymerization chemical functionalization, either before or after isoporous structure formation. Suitable fluorinated monomers/block chemistries include, but are not limited to, perfluorinated C3-C6 linear and cyclic compounds, fluorinated compounds such as, but not limited to, octafluoropropane (perfluoropropane), decafluorobutane (perfluorobutane), dodecafluoropentane (perfluoropentane), tetradecafluorohexane (perfluorohexane), dodecafluorocyclohexane (perfluorocyclohexane); fluorinated C6-C9 aromatic compounds; fluorinated acrylics such as, but not limited to, 2,2,3,3,4,4,5,5,6,6,7,7-dodecafluoroheptyl acrylate, 3,3,4,4,5,5,6,6,7,7,8,8,9,9,10,10,11,11,12,12,12-heneicosafluorododecyl acrylate, 3,3,4,4,5,5,6,6,7,7,8,8,9,9,10,10,10-heptadecafluorodecyl methacrylate, 2,2,3,3,4,4,4-heptafluorobutyl acrylate, 2,2,3,3,4,4,4-heptafluorobutyl methacrylate, 2,2,3,4,4,4-hexafluorobutyl acrylate, 2,2,3,4,4,4-hexafluorobutyl methacrylate, 1,1,1,3,3,3-hexafluoroisopropyl acrylate, 1,1,1,3,3,3-hexafluoroisopropyl methacrylate, 2,2,3,3,4,4,5,5-octafluoropentyl acrylate, 2,2,3,3,4,4,5,5-octafluoropentyl methacrylate, 2,2,3,3,3-pentafluoropropyl acrylate, 2,2,3,3,3-pentafluoropropyl methacrylate, 1H,1H,2H,2H-perfluorodecyl acrylate, 2,2,3,3-tetrafluoropropyl methacrylate, 3,3,4,4,5,5,6,6,7,7,8,8,8-tridecafluorooctyl acrylate, 3,3,4,4,5,5,6,6,7,7,8,8,8-tridecafluorooctyl methacrylate, 2,2,2-trifluoroethyl methacrylate, 1,1,1-trifluoro-2-(trifluoromethyl)-2-hydroxy-4-methyl-5-pentyl methacrylate, 2-[(1',1',1'-trifluoro-2'-(trifluoromethyl)-2'-hydroxy)propyl]-3-norbornyl methacrylate; fluorostyrenes such as, but not limited to 2-fluorostyrene, 3-fluorostyrene, 4-flourostyrene, 2,3,4,5,6-pentafluorostyrene; other fluorine containing monomers such as, but not limited to epifluorohydrin, glycidyl 2,2,3,3,4,4,5,5-octafluoropentyl ether, glycidyl 2,2,3,3-tetrafluoropropyl ether, perfluorohexylethylene, 3,3,4,4,5,5,6,6,6-nonafluoro-1-hexene, 3,3,4,4,5,5,6,6,7,7,8,8,9,9,10,10,10-heptadecafluoro-1-decene, and (2,2,3,3,4,4,5,5,6,6,7,7,8,8,9,9,9-heptadecafluorononyl)oxirane.

Mixtures of chemistries within a single block are denoted with "-co-" and two structures bound by a single set of brackets, as shown in Table 1, above. The distribution of mixed chemistries in a block may be periodic (ordered), random/statistical, or graded within the block.

In some embodiments, the material is packaged as a device including: a pleated pack, flat sheets in a crossflow cassette, a spiral wound module, hollow fiber, a hollow fiber module, or as a sensor. In an embodiment, a device utilizes more than one different isoporous fluorinated material.

In one embodiment, the material or device comprising the material has a detectable response to a stimulus/stimuli.

In some embodiments, the material, or a device comprising the material, is used in a process wherein an analyte of interest is separated in a medium containing the analyte of interest contacting the material or device. In one such process, the analyte of interest is separated by binding and eluting. In another such process, solutes or suspended particles are separated by filtration. In another such process, both bind and elute and separation by filtration mechanisms are incorporated.

In some embodiments, the material, or a device comprising the material, is used in a process wherein an analyte of interest is detected in a medium containing the analyte of interest contacting the material or device. In one such process, the analyte of interest is detected by a response of the material/device to the presence of the analyte of interest.

In some embodiments, at least two different material are packaged together as a kit. In other embodiments, at least two devices comprising the material are packaged together as a kit.

In some embodiments, the material is immobilized to or integrated with a support or a textile.

A method for achieving the invention involves: dissolution of a block copolymer in at least one chemical solvent; dispensing the polymer solution onto a substrate or mold, or through a die or template; removal of at least a portion of the chemical solvent; exposure to a nonsolvent causing precipitation of at least a portion of the polymer, and optionally, a wash step.

Non-limiting examples of fluorination of polymer blocks after polymerization are provided below.

A)

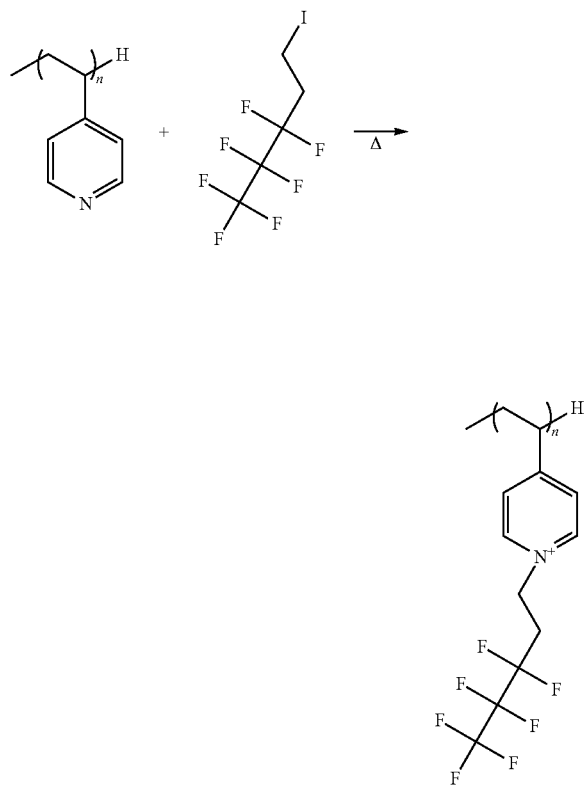

B)

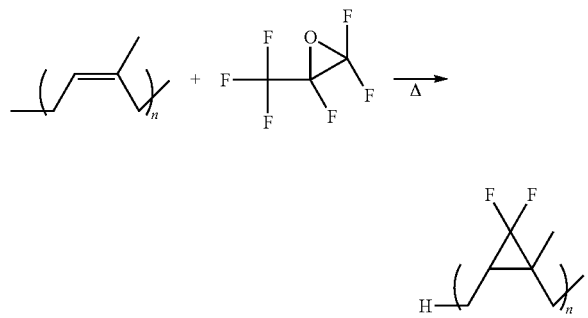

C)

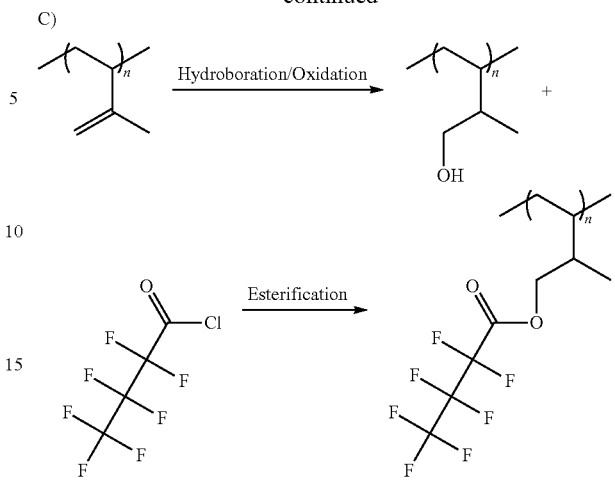

As shown above, step "A)" is the fluorination of poly(4-vinylpyridine) with 1,1,1,2,2,3,3,-heptafluoro-5-iodopentane wherein upon heating, the iodine on the 1,1,1,2,2,3,3,-heptafluoro-5-iodopentane is a leaving group for attachment to the nitrogen on the poly(4-vinlypyridine), resulting in a quaternized pyridine and fluorinated poly(4-vinylpyridine) block. Step "B)" is the fluorination of cis-1, 4 poly(isoprene) wherein upon heating 2,2,3-trifluoro-3-(trifluoromethyl)oxirane reacts to fluorinate the double bond of the poly(isoprene). In step "C)" the fluorination of 3, 4-poly (isoprene) in two steps: first, a hydroboration/oxidation reaction to introduce a hydroxyl group off the poly(isoprene) double bond, then an esterification reaction with heptafluorobutanoyl chloride wherein the chloride on heptafluorobutanoyl chloride is a leaving group, resulting the fluorinated poly (isoprene).

The first approach for producing the isoporous structures is the direct polymerization of fluorinated monomer units into the block copolymer. This is achieved with a partial or complete fraction of fluorine-containing monomer units polymerized directly in the polymer block(s). This approach directly incorporates the fluorinated atoms through chemical bonding into the polymer which is subsequently processed into the isoporous material. Another similar approach is initiating or terminating the polymerization with a fluorinated molecule or macromolecule to fluorinate the copolymer with a single unit.

Another approach is chemically modifying a block copolymer not containing fluorinated units to include fluorine atoms in at least one block. This fluorine-modified (fluorinated) copolymer is subsequently processed into the fluorinated isoporous material. The fluorinated units are introduced by reaction to the multiblock polymer with a compound, such as, but not limited to, fluorine-containing compounds wherein the compound contains another halide such as bromine, chlorine, or iodine which serves as a leaving group for attachment to the polymer (e.g. 1,1,1,2,2,3,3-heptafluoro-5-iodopentane, 1,1,1,2,2,3,3,4,4,5,5,6,6,7,7,8,8-heptadecafluoro-10-iododecane perfluoropropyliodide, heptafluorobutanoyl chloride); fluorine; hexafluoropropylene oxide; sulfur tetrafluoride; difluorocarbene; trifluoroacetic anhydride; and difluoroacetic anhydride.

A still further approach for the fabrication of the isoporous material is post-modifying isoporous block copolymer materials to incorporate fluorine atoms. One such approach is the chemical modification of isoporous material to include fluorine atoms. This method involves directly chemically modifying the isoporous material, such that surfaces of the polymer block, including pore surfaces are modified. The aforementioned compounds are also suitable for this approach.

Combinations of these approaches are also used to achieve the isoporous material. For example, fluorinated monomer is polymerized to fluorinate one block of the copolymer, and subsequently another unfluorinated block is post-fluorinated.

The amount of fluorination and chemistry of the fluorinated material is controllable. This is controlled through varying the amount of fluorinated reagents relative to unfluorinated material during either polymerization or post-functionalization.

One variant is partially or completely fluorinating units of more than one block of the constituent copolymer. Which block(s) is/are fluorinated is not limited to the block that comprises the structure's major surface. Crosslinking with a fluorinated compound is another approach to imparting chemical resistance to membranes, through a combination of cross-linking and fluorination.

The pore size of the isoporous region of the membrane is also controllable. The pore size can be varied from ~1-200 nm.

Isoporous block copolymer membranes incorporating fluorination in/on at least a portion of at least one block of the block copolymer. This imparts chemical resistance and antifouling properties to the membranes.

The polymers may be synthesized in any manner with the proviso that the polymer can self-assemble and form the isoporous material through the described methods.

| Table of features identified in Figures 1(A)-1(C) | |
|---|---|
| 10 | Isoporous portion of material |
| 20 | Fluorinated portion of material |
| 30 | Reaction to introduce fluorination to material |

The invention claimed is:

1. A multiblock isoporous fluorinated polymer material comprising at least two distinct polymer blocks, wherein a first of said distinct polymer blocks is a fluorinated block having a structure:

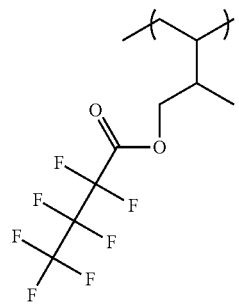

wherein the multiblock isoporous fluorinated polymer material contains continuous microporous domains and isoporous mesoporous wall structures; and wherein the isoporous mesoporous wall structures comprise isoporous mesopores.

2. The material of claim 1 wherein the multiblock fluorinated polymer material is asymmetric.

3. The material of claim 1, wherein the mesopores have a size of about 1-200 nm.

4. The material of claim 1 wherein the material is formed into a two-dimensional structure.

5. The material of claim 1 wherein the material is formed into a three-dimensional structure.

6. The material of claim 1 wherein the material is made by a process comprising:
   a. polymerizing a multiblock polymer comprising 3,4-poly(isoprene) blocks; and
   b. fluorination of the 3,4-poly(isoprene) blocks via introduction of a hydroxyl group on a double bond of the 3,4-poly(isoprene) followed by esterification with heptafluorobutanoyl chloride to produce the multiblock fluorinated polymer.

7. The material of claim 6, wherein the fluorination of the 3, 4-poly (isoprene) blocks is performed before the formation of the isoporous structure.

8. The material of claim 1 wherein the material does not degrade, decompose, or dissolve when exposed to acidic solutions, basic solutions, petrochemical products, organic solvents, or other organic small molecules.

9. The material of claim 1 wherein the material does not degrade, decompose, or dissolve at elevated temperatures relative to room temperature.

10. A process separating or detecting an analyte of interest, the method comprising contacting a medium containing the analyte of interest with the material of claim 1.

* * * * *